United States Patent [19]

Blomgren, Sr. et al.

[11] 3,757,079

[45] Sept. 4, 1973

[54] METHOD AND APPARATUS FOR ELECTRIC ARC WELDING UTILIZING HIGH VOLTAGE, LOW CURRENT ELECTROSTATIC COOLING

[75] Inventors: Oscar C. Blomgren, Sr.; Oscar C. Blomgren, Jr., both of Lake Bluff, Ill.

[73] Assignee: Inter-Probe, Inc., North Chicago, Ill.

[22] Filed: July 2, 1971

[21] Appl. No.: 159,355

[52] U.S. Cl. ..................... 219/137, 219/60, 219/76, 219/130, 219/131
[51] Int. Cl. .............................................. B23k 9/00
[58] Field of Search ....................... 219/60, 76, 123, 219/131, 130, 137, 128, 133

[56] References Cited
UNITED STATES PATENTS

| | | | |
|---|---|---|---|
| 3,224,497 | 12/1965 | Blomgren, Sr. et al. | 165/2 |
| 3,586,817 | 6/1971 | Manz | 219/137 |
| 3,089,945 | 5/1963 | Connoy et al. | 219/76 |
| 2,620,422 | 12/1952 | Volff | 219/130 |

OTHER PUBLICATIONS

"Electrostatic Cooling Balances Heat From Plasma Arc" Design News Jan. 18, 1971.

*Primary Examiner*—R. F. Staubly
*Assistant Examiner*—George A. Montanye
*Attorney*—Lloyd L. Zickert

[57] ABSTRACT

Method and apparatus for welding metal workpieces to provide a distortion-free weld of high integrity where the method includes the use of an electric arc welding head for carrying out the usual welding operation and means for generating an electrostatic field at or adjacent the point of weld to facilitate heat transfer and otherwise treat the welding operation, thereby resulting in overcoming welding problems heretofore encountered, and in particular producing a weld having grain size substantially as fine as the base metal workpieces and, retarding the formation of scale and discoloration of the weld surface during the welding cycle. Apparatus for carrying out the method includes high voltage probe means arranged adjacent the workpiece being welded, and connecting the probe means to a high voltage, low current potential such as to cause corona at the probe means and/or the workpiece and connecting the workpiece to ground potential.

20 Claims, 7 Drawing Figures

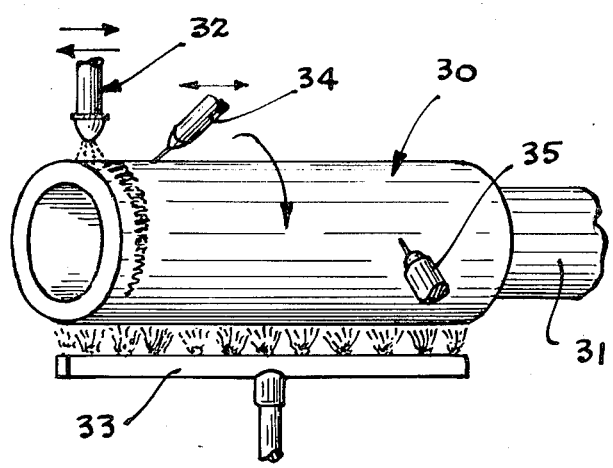
FIG.4
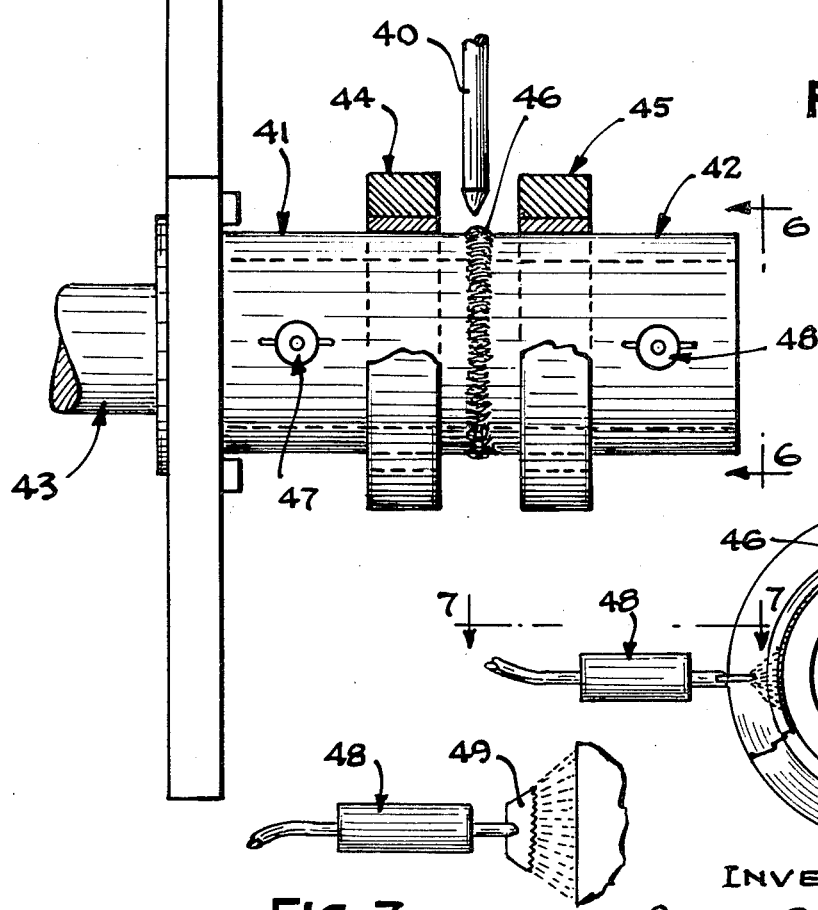
FIG.5
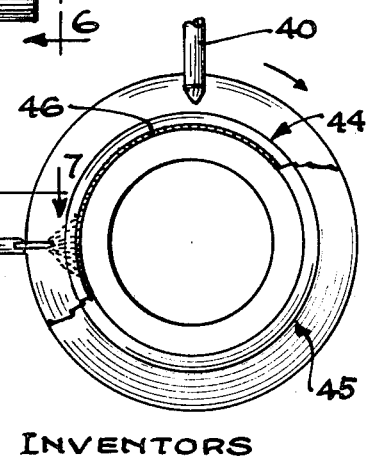
FIG.6
FIG.7
INVENTORS
Oscar C. Blomgren, Sr.
Oscar C. Blomgren, Jr.
BY Kinzer, Dorn & Zickert
ATTORNEYS

METHOD AND APPARATUS FOR ELECTRIC ARC WELDING UTILIZING HIGH VOLTAGE, LOW CURRENT ELECTROSTATIC COOLING

This invention relates in general to a method and apparatus for welding of metal parts or workpieces, and particularly to a method and apparatus for treating the weld during an electric arc welding operation to obtain a weld having an integrity at least as good as the base metal.

The present invention is applicable to welding ferrous or nonferrous metal parts together, such as flat steel plates or cylindrical steel tubes, wherein the weld may be applied in single or multiple layers, and to apply hard face coatings to parts by welding methods, although it is likewise useful for any other welding operations. For example, the present invention is particularly useful in arc welding processes such as the Tig welding (tungsten electrode inert gas shielded) of steel parts wherein the penetration and integrity of the weld is materially improved and made substantially the same as the base metal. Further, the present invention is useful in the Mig welding (consumable electrode inert gas shielded) of tubular steel parts when welding same together and applying several layers of weld. Still further, the present invention is especially useful in plasma arc metal deposition, such as applying a hard facing to a hard alloy bushing where a substantially distortion free weld of greater integrity is obtained free of internal defects. Before the present invention, none of the welding operations abovementioned could be achieved free of flaws. It should be further appreciated the present invention encompasses all electric arc welding processes.

It is therefore an object of the present invention to provide a new and improved method and apparatus for welding.

Another object is to provide a method and apparatus for welding that produces a metallurgically superior weld.

Another object of the present invention is in the provision of a method and apparatus for welding parts together wherein the resultant weld has integrity substantially equal to the welded parts.

A still further object of the present invention is in the provision of a method and apparatus for welding parts together wherein a plurality of weld layers are continuously applied without intervening treatment of the previous weld surface.

Another object of the invention is to provide a method and apparatus for welding parts together which greatly increases the life of electrodes used in the welding process by reducing the possibility of electrode maladjustment.

A further object of the present invention resides in the provision of a new and improved method and apparatus for welding applicable to hard face welding onto parts wherein the invention provides a distortion free weld surface free of internal defects, thereby having greater integrity.

Other objects, features and advantages of the invention will be apparent from the following detailed disclosure, taken in conjunction with the accompanying sheets of drawings, wherein like reference numerals refer to like parts, in which:

FIG. 4 is a perspective and somewhat diagrammatic view of a hard face welding operation and apparatus according to the present invention for facilitating the welding operation;

FIG. 5 is a front elevational view with some parts broken away and other parts shown in section of a welding machine according to the invention employed for welding of successive weld layers to join tubing;

FIG. 6 is an end view of the embodiment of FIG. 5 taken generally along Line 6—6 of FIG. 5 with parts broken away;

FIG. 7 is a top plan view of the probe employed in the embodiments of FIGS. 5 and 6 and taken generally along Line 7—7 of FIG. 6.

Figure 1:
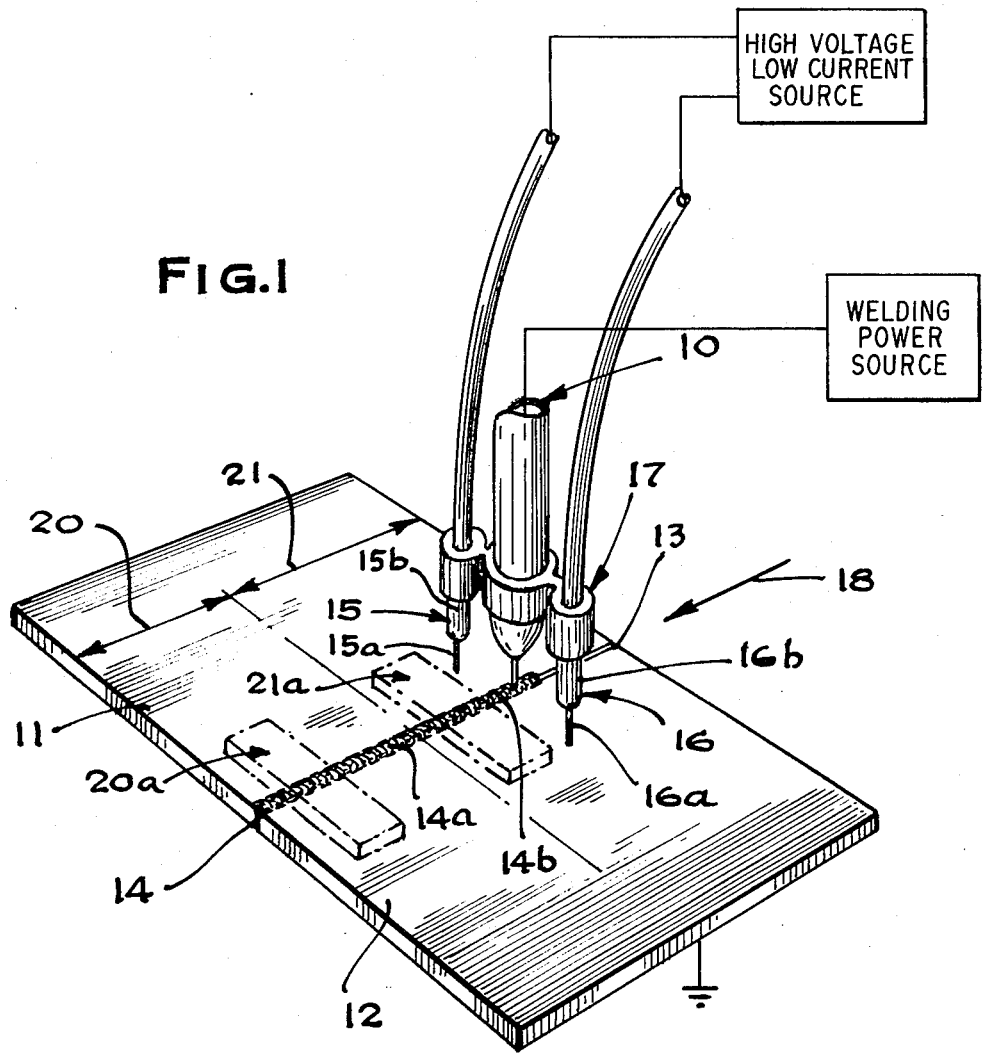
FIG. 1 is a perspective view of a pair of workpieces being welded together and illustrating a welding head and the present invention.

The welding method and apparatus of the present invention in one form is illustrated in FIG. 1 where a Tig welding head 10 is shown superimposed over a pair of mild steel plates 11 and 12 arranged together in abutting relation to define therebetween a weld line or seam 13. A weld 14 is partially made along the weld line 13, as illustrated. Mounted to the welding head 10 and movable therewith is a pair of high voltage probes 15 and 16, and as illustrated, the probes are supported by a bracket 17 carried by the welding head 10. The probes 15 and 16 are mounted at opposite sides of the welding head and preferably slightly ahead of the welding head as it moves in the direction of the arrow 18. Accordingly, the probes 15 and 16 are at the opposed steel plates 11 and 12 and move over these plates. However, it should be appreciated that any number of probes may be placed wherever neeeded, that is, it would be preferable to treat any part of the plates where heat of such magnitude that would seem detrimental is present. For example, the probes might be positioned ahead, behind, above, or below the workpiece.

The probes 15 and 16 include pointed or sharp conductive members 15a and 16a held by an insulating body 15b and 16b which may be in the form of an insulated conductor that is suitably connected to a source of high voltage low current potential on the order of 15 to 60 kilovolts (kv). Preferably, the potential is dc, although it may be ac. The steel plates 11 and 12 are suitably connected to ground potential. Accordingly, energizing of the probes 15 and 16 produces an electrostatic field at the upper surfaces of the steel plates 11 and 12, which will among other things enhance the heat transfer coefficient at the surfaces and enhance control temperature of the parts. It should be appreciated the electrostatic field may penetrate the surfaces, and defining such at the surfaces includes any possible penetration. The conductive elements 15a and 16a are spaced from the surfaces of the plates 11 and 12 a sufficient distance depending upon the potential applied to prevent arcing between the conductive elements and the plates. The current draw is in the microampere range of 20 to 300, thereby producing a low power requirement for the source of potential.

An actual example of the operation of the invention so that it can be compared with welding without the use of the invention consists of welding steel plates with a Tig welding head, first with no power being fed to the probes 15 and 16 to produce a weld along the area identified as 20, and then with power being delivered to the probes to produce a weld along the area identified as 21.

Figure 2:
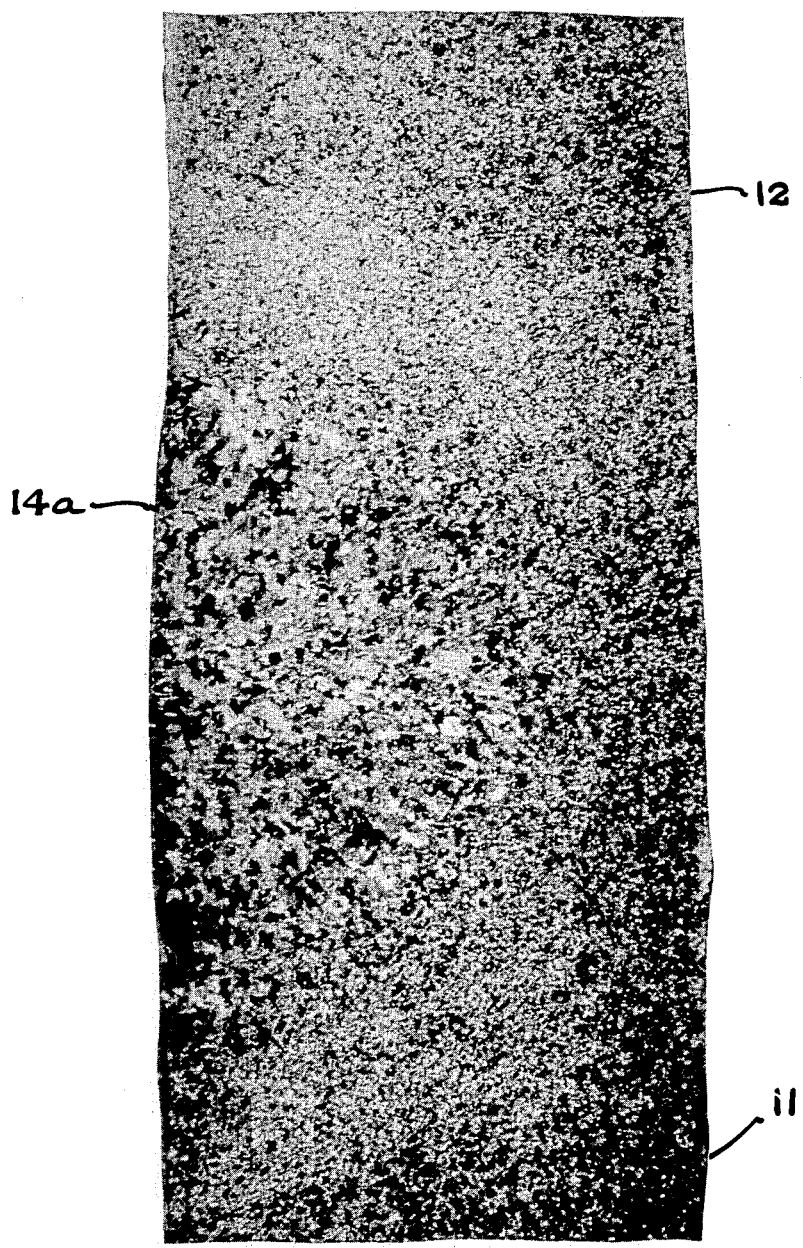
FIG. 2 is a photomicrograph of an actual weld made with a Tig welding process on a pair of mild steel plates and illustrating the grain structure of the weld.

A photomicrograph of the weld and adjacent plates taken of a cross section of the weld along the area 20 at 20a when the probes were not energized and where the plates are of a mild 1016 steel sheet ⅛ inch thick is shown in FIG. 2. The weld is identified as 14a and it is noted that the grain structure of the weld is non-uniform and substantially larger than that of the steel plates 11 and 12.

Figure 3:
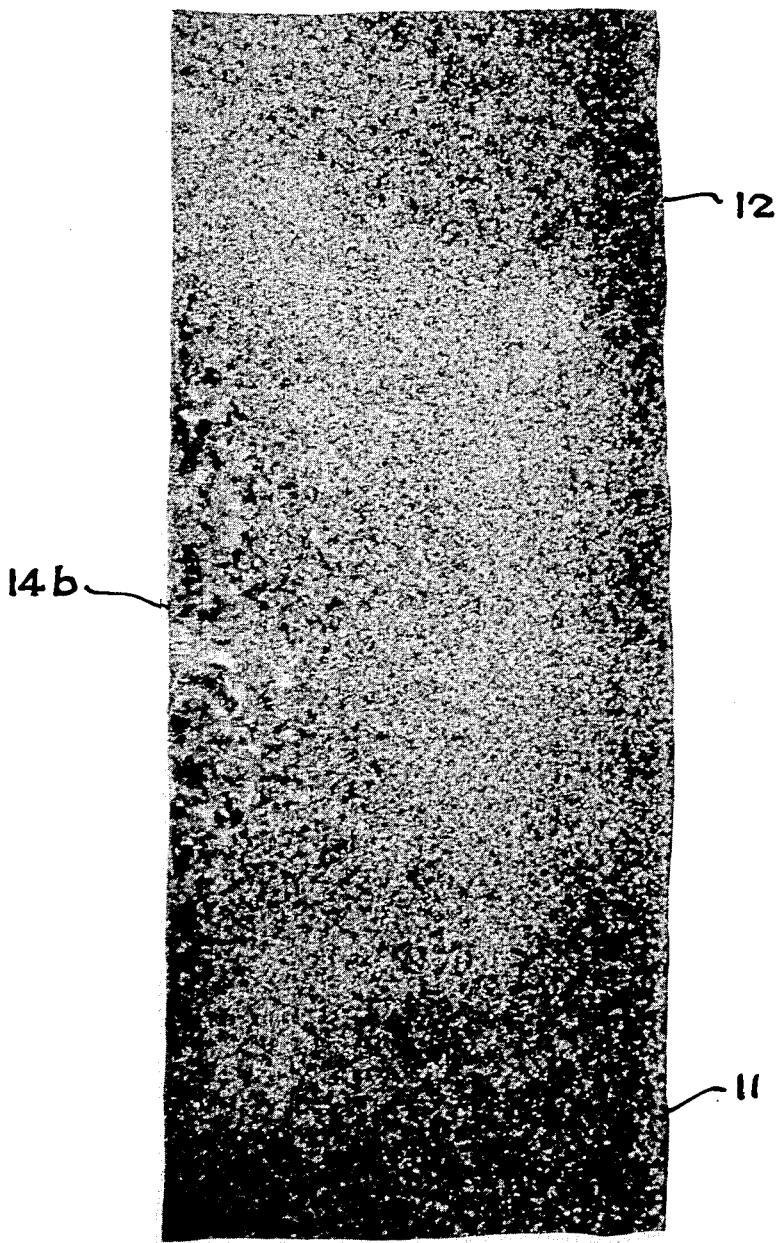
FIG. 3 is a view similar to FIG. 2, but illustrating the weld as resulting from the method and apparatus of the present invention, and dramatically showing the weld grain structure to be much finer than that of FIG. 2.

FIG. 3 shows a photomicrograph of a cross section taken through the weld along area 21 at 21a when the probes 15 and 16 were activated by a potential of 20 to 30 kv. The weld grain size in the weld 14b is homogeneous and considerably finer than the weld 14a and substantially as fine as the base metal of plates 11 and 12. Accordingly, the weld made by the present invention will have greater integrity, be homogenous, be stronger and have more ductility.

The embodiment of FIG. 4 illustrates a welding process where metal deposition in the form of hard facing materials is applied to a rotating workpiece to define a hard face coating on the workpiece. For example, the process is used to face hard alloy bushings with a hard metal coating of nickel-chrome-boron material utilizing plasma arc welding. A typical plasma arc welder operates at approximately 8,000°F. A typical layer thickness of hard coating may be about one-eighth inch. Because of the high temperatures involved, which if not controlled, uneven distribution and erratic solidification of the facing material may result producing an unacceptable coating. External cooling, such as with an air jet, solidifies the surface of the deposited material first, which may produce voids and/or create thermal shock because of internal shrinkage. The present invention, wherein electrostatic cooling of weld puddle and workpiece results in internal cooling of the weld puddle, overcomes the problems heretofore encountered where external cooling was used, and produces a distortion-free and flaw-free coating structure. Further, the present invention accurately and efficiently controls the temperature of the workpiece and hard face coating so that a coating of greater integrity is applied to the workpiece. It is now possible, with the present invention, to construct a single heavy layer of facing material that is superior to multilayer coating heretofore relied on. Because the present invention has the ability to control heat to avoid shrinkage defects, it is no longer necessary to apply such a thin coat of facing material.

As shown in FIG. 4, a workpiece 30 is suitably mounted on a rotating mandrel 31. The workpiece is in the form of a bushing or sleeve, the outer surface of which it is desired to have applied thereto a hard face coating. A plasma arc welding head 32 is positioned at approximately top dead center of the rotating workpiece so that the hard face coating may be applied at that point. The welding head 32 oscillates along a path parallel to the rotating axis of the workpiece, although it may be stationary if desired. Flame pre-heaters 33 are arranged at approximately bottom dead center to pre-heat the workpiece to about 700°F. prior to metal coating operation.

An electrostatic probe 34 is suitably mounted adjacent to the welding head 32 and preferably to oscillate with the head so as to harden the weld puddle before it comes too far beyond top dead center and is distorted by gravity. Air jet impingement heretofore used is not satisfactory, as to provide a sufficient amount of gas to cool the weld, results in physically distorting the weld. A second electrostatic probe 35 is mounted adjacent the far end of the workpiece to prevent overheating of same, which is the last to receive the metal deposition weld. As in the first embodiment, the electrostatic probes 34 and 35 are connected to a source of high voltage potential on the order of 15 to 60 kv, while the workpiece is preferably connected to ground potential. The probes are spaced from the surface of the hard coating or workpiece a sufficient distance to prevent arcing over. While the probes shown are of the type having a needle-like end, as in the probes shown in FIG. 1, it should be appreciated that they may take the form of a serrated blade defining a plurality of points. Also, as many probes as necessary to control temperature would be employed. Further, it should be appreciated that hard coating material may be applied to a flat sheet and that the invention would likewise apply to control the temperature of the workpiece and the solidification of the weld puddle.

Another application of the present invention is illustrated in FIGS. 5, 6 and 7 wherein a Tig welding head 40 is shown in position above a pair of tubular workpieces 41 and 42 arranged in abutting relation on a rotating mandrel 43. This welding operation is intended to weld the workpieces 41 and 42 together by successively applying a plurality of weld layers. Heretofore, the welding operation encompassed welding a 2 inch length of the circumference of the workpiece, stopping the welding operation, cooling the workpiece with compressed air, and successively welding 2 inch lengths of the circumference until one single weld layer had been applied over the entire circumference. Thereafter, it was necessary to thoroughly grind and clean the outer weld surface and repeat the welding operation until a plurality of welds, such as 21 in number, were applied in layer fashion. This process included utilizing the heat sinks 44 and 45 in attached relation to the workpieces at opposite sides of the weld 46. Each heat sink includes an inner ring of copper and an outer ring of steel.

Utilizing electrostatic probes in accordance with the present invention, wherein a pair of probes 47 and 48 are arranged adjacent the workpieces at the opposite sides of the heat sinks 44 and 45, and just ahead of the welding head 40, each probe includes a conductive end portion 49 in the form of a blade having an outer serrated edge defining a plurality of side-by-side points. As in the other embodiments, the probe is connected to a high voltage potential on the order of 15 to 60 kv, while the workpieces and mandrel are connected to ground potential. While only two probes are shown, any number may be used as is necessary.

With the present invention, it is no longer necessary to stop rotation of the mandrel to effect cooling of the workpieces, and therefore a single welding layer may be applied along the entire circumference by continuous rotation of the workpieces and mandrel. Further, the grinding and cleaning of the weld is eliminated, thereby eliminating the necessity to stop the welding operation after applying a single layer along the entire circumference so that successive layers may be successively applied to thereby reduce the labor costs involved in the welding operation. While the electrostatic probes are illustrated and positioned about 90° from the welding head, it should be appreciated that they may be arranged in other positions along the circumference of the workpieces to treat the workpieces during the welding operation.

It will be understood that modifications and variations may be effected without departing from the scope of the novel concepts of the present invention, but it is understood that this application is to be limited only by the scope of the appended claims.

The invention is hereby claimed as follows:

1. A method of welding a pair of side-by-side ferrous workpieces together with an electric arc welder having a welding head which comprises the steps of, welding the workpieces together by advancing the welding head along the adjacent edges thereof, and simultaneously applying an electrostatic field to the workpieces at each side of the adjacent edges and the weld of such magnitude to cause metallurgical formation of the weld area, said step of applying an electrostatic field including the positioning of probe means adjacent the welding head and workpieces, connecting the workpieces to ground potential, and connecting said probe means to a high voltage low-current source such as to preclude arcing.

2. A method as defined in claim 1, wherein the step of welding is Tig welding.

3. A method as defined in claim 1, wherein the step of welding is Mig welding.

4. A method as defined in claim 1, wherein the step of connecting the probe means to a high voltage low current source includes a direct current potential of such a magnitude as to cause corona on the probe means and a low current flow in said field.

5. A method of welding abutting steel parts together along abutting edges with a welder having an inert gas shielded electric arc welding head which comprises the steps of, arranging steel parts together in abutting relation defining a weld line, positioning a welding head adjacent the parts to move along the weld line, mounting a probe on the welding head on each side of the head and in spaced relation to the parts, connecting the probes to a source of high voltage potential to create an electrostatic field at the surfaces of the parts on each side of the weld line and a low current flow in said field such as to preclude arcing, and welding the parts together by traversing the welding head and probes in a path along the weld line, wherein the grain size in the weld is substantially the same as that in the steel parts.

6. A method as defined in claim 5, wherein the step of welding is Tig welding.

7. A method as defined in claim 6, wherein the step of welding is Mig welding.

8. The method of producing a weld having a grain size substantially equal to that of the base metal when welding two workpieces together thereby producing a weld of substantially the same integrity as the base metal, said method comprising the steps of, aligning a pair of workpieces in edge to edge abutting relation defining a seam along which a weld may be made to join the workpieces together, positioning a welding head of an electric arc welding machine above the seam and moving the head therealong to produce a weld at the seam, connecting the workpieces to ground potential, and positioning electrostatic probe means connected to a high voltage potential of 15 to 60 kilovolts adjacent the workpieces and adjacent the head and moving same along the weld with the welding head to simultaneously weld the workpieces together and produce an electrostatic field at the workpieces and a low current flow through the field such as to preclude arcing.

9. The method of claim 8, wherein the step of positioning electrostatic probe means includes positioning a plurality of probes above the workpieces and adjacent the head.

10. The method of claim 9, wherein the step of positioning electrostatic probe means includes positioning a first probe on one side of the head over one workpiece and a second probe on the other side of the head over the other workpiece.

11. The method of claim 10 wherein the step of positioning the probes includes positioning same slightly ahead of and to the opposite sides of the welding head.

12. The method of applying a hard face coating to a ferrous workpiece by using a welding machine which comprises, the steps of moving a welding head relative the workpiece to weld a layer of hard facing thereto, and simultaneously setting up an electrostatic field at the surface of the workpiece and the weld of such magnitude as to metallurgically condition the coating, said step of setting up an electrostatic field including the positioning of pointed probe means adjacent to the workpiece, connecting the workpiece to ground potential, and connecting the probe means to a high voltage source, and establishing a low current flow in said field such as to preclude arcing.

13. The method of claim 12, wherein the high voltage source is in the range of 15 to 60 kilovolts.

14. Welding apparatus adapted for welding abutting metal parts together to provide a weld having a grain structure substantially identical to that in the metal parts, said apparatus comprising, an inert gas shielded electric arc welding head movable along the abutting edges of the parts, a pair of probes having pointed end portions adjacent the parts but in spaced relation thereto and positioned at each side of the abutting edges adjacent the welding head, a source of high voltage potential connected to said probes of a level slightly less than that which would cause arcing to the parts, means connecting the parts to ground potential, said potential causing a low current flow between the probes and parts, and means causing said probes to move with said welding head.

15. Apparatus as defined in claim 14, which includes means mounting said probes slightly ahead of said welding head relative the direction of movement of the head.

16. Apparatus for producing a weld having a grain size substantially the same as the base metal when welding two workpieces together, wherein the workpieces are aligned and in edge-to-edge abutting relation defining a seam along which a weld may be made to join the workpieces together, said apparatus comprising, an electric arc welding machine having a welding head positioned adjacent the workpieces and movable along the seam, electrostatic probe means connected to a high voltage potential of 15 to 60 kilovolts positioned adjacent the workpieces and the head and mounted on and movable with the head during the welding operation, and means connecting the workpieces to ground potential to establish a low current flow between the probe means and the workpieces such as to preclude arcing.

17. Apparatus as defined in claim 16, wherein the welding machine is a Tig welder.

18. Apparatus as defined in claim 16, wherein the welding machine is a Mig welder.

19. Apparatus for welding ferrous or non-ferrous workpieces together so that the grain structure of the weld is fine and homogeneous comprising, an electric arc welder having a welding head, probe means adjacent the workpieces and having pointed portions spaced from the surfaces of the workpieces, means connecting the workpieces to ground potential, a source of high voltage potential connected to said probe means of a level slightly less than that which would cause arcing across to the workpieces and of a level to establish a low current flow between said probe means and workpieces.

20. Apparatus as defined in claim 19, wherein said welder is an arc welder, and wherein said potential is in the range of 15 to 60 kilovolts DC.

* * * * *